United States Patent [19]

Sontea et al.

[11] Patent Number: 5,675,929
[45] Date of Patent: Oct. 14, 1997

[54] PLANT CULTURE METHOD AND SUPPORT SUBSTRATE APPLIED THERETO

[75] Inventors: Cho Sontea, Nagoya; Sumio Takigawa, Toyoake; Ryoichi Ueda, Nagoya, all of Japan

[73] Assignee: Kabushiki Kaisha Tokai Yukinosan, Nagoya, Japan

[21] Appl. No.: 562,874

[22] Filed: Nov. 27, 1995

[30] Foreign Application Priority Data

Nov. 25, 1994 [JP] Japan ............................ 6-291619
Jul. 14, 1995 [JP] Japan ............................ 7-179179

[51] Int. Cl.⁶ .......................................... A01G 31/00
[52] U.S. Cl. ........................... 47/18; 47/65.6; 47/65.9; 47/62; 47/64
[58] Field of Search .................... 47/59 C, 59 CO, 47/64, 66 D, 62 C, 65.9, 65.6; 45/59, 62 C, 59 CO, 59 C

[56] References Cited

U.S. PATENT DOCUMENTS

| | | | |
|---|---|---|---|
| 5,407,470 | 4/1995 | Jutzi | 47/59 CO |
| 5,471,786 | 12/1995 | Clausen | 47/59 CO |
| 5,472,475 | 12/1995 | Adam | 47/59 CO |

FOREIGN PATENT DOCUMENTS

| | | | |
|---|---|---|---|
| 0065004 | 5/1977 | Japan | 47/59 CO |
| 2171617 | 7/1987 | Japan | 47/59 CO |
| 3222630 | 9/1988 | Japan | 47/59 CO |
| 1141526 | 6/1989 | Japan | 47/59 CO |
| 2124037 | 5/1990 | Japan | 47/59 CO |

*Primary Examiner*—Henry E. Raduazo
*Attorney, Agent, or Firm*—Hazel & Thomas

[57] ABSTRACT

A culture method of growing plants or plant seedlings on a culture medium provided on a support substrate which is comprised of an upper layer made of small stone and activated charcoal integrally solidified by synthetic resin in such a manner as to maintain water permeability therein and a lower layer in the form of a water permeable reinforcement layer integrally formed with the upper layer.

8 Claims, 4 Drawing Sheets

PLANT CULTURE METHOD AND SUPPORT SUBSTRATE APPLIED THERETO

BACKGROUND OF THE INVENTION

1. Field of the Invention

The present invention relates to a culture method of plant seedlings or plants and a support substrate applied to the culture method.

2. Description of the Prior Art

Illustrated in FIG. 10 is a conventional support substrate for cultivation of rice seedlings which is comprised of a foamed plastic board 41 mounted on a support bed 40 and an amount of water permeable sand 43 deposited on the foamed plastic board 41 through a perforated vinyl sheet 42. For cultivation of rice seedlings, the support substrate is provided thereon with a culture medium 44 which is made of silicate calcium fibers mixed with nitrogen content, phosphoric content, potassium content and the like to germinate rice seeds sowed thereon for growing rice seedlings.

In use of the support substrate for cultivation, it has, however, been found that there occurs irregularity in germination of the rice seeds or growth of rice seedlings. The support substrate for the culture medium 44 is insufficient in strength since it is comprised of the foamed plastic board 41 and spread sand 43. In addition, water permeated into the sand 43 may not be smoothly drained through the foamed plastic board 41 due to poor water permeability thereof. In the case the foamed plastic board 41 is covered with the vinyl sheet 42, drainage of the water is permitted only at the periphery of the foamed plastic board, resulting in delay of the water drainage. This causes root rot of the rice seedlings.

SUMMARY OF THE INVENTION

Accordingly, a primary object of the present invention is to provide a culture method for uniformly growing plant seedlings or plants in good health and to provide a support substrate suitable for culture of the plant seedlings or plants.

According to the present invention, the object is accomplished by providing a culture method for growing plants on a culture medium provided on a substrate made of dielectric and non-magnetic granular articles such as small stone and activated charcoal integrally solidified by synthetic resin in such a manner as to maintain water permeability therein.

In a practical embodiment of the present invention, it is preferable that the small stone and activated charcoal are mixed at a ratio of 0.5–1.0. It is also preferable that the support substrate is comprised of an upper layer made of dielectric and non-magnetic granular articles such as small stone solidified by synthetic resin in such a manner as to maintain water permeability therein and a lower layer in the form of a water permeable reinforcement layer.

BRIEF DESCRIPTION OF THE DRAWINGS

Other objects, features and advantages of the present invention will be more readily appreciated from the following detailed description of preferred embodiments thereof when taken together the accompanying drawings, in which.

DESCRIPTION OF PREFERRED EMBODIMENTS

Figure 1:
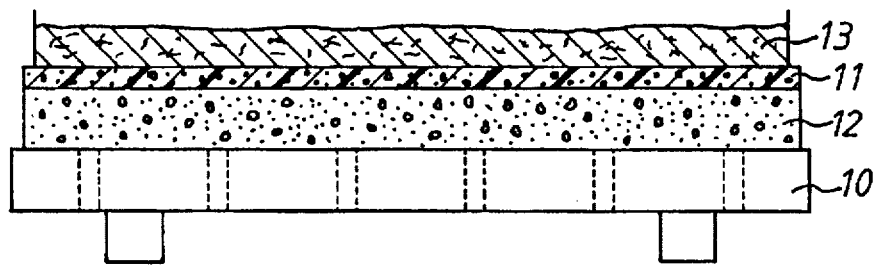
FIG. 1 is a sectional view of a support substrate for cultivation of paddy rice seedlings in accordance with the present invention.

Hereinafter, a preferred embodiment of a culture method of paddy rice and a support substrate for cultivation of paddy rice will be described in detail with reference to the drawings. As shown in FIG. 1, the support substrate for cultivation of paddy rice is in the form of a preformed board or seedbed which is comprised of upper and lower layers 11 and 12 placed on a support bed 10. The lower layer 12 is in the form of a rectangular board of 605 cm in width, 1820 cm in length and 35 mm in thickness, while the upper layer 11 is in the form of a rectangular board of the same size as the lower layer 12 and 4–5 mm in thickness. The lower layer 12 is adapted as a reinforcement material superior in water permeability which is in the form of an autoclaved lightweight concrete board. In this embodiment, the lower layer 12 is made of cement and sand which were mixed with a foaming agent added thereto and solidified while being applied with air. The upper layer 11 is in the form of a water permeable layer made of dried small stone of 3.5 kg and activated charcoal of 2.5 kg which were mixed at a ratio of 1.4:1 with urethane resin of 230 g and a hardening agent of 90 g added thereto and solidified in a condition deposited on the lower layer 12 in thickness of about 4–5 mm.

During the process of making the upper layer 11, epoxy resin may be substituted for urethane resin in the same amount or mixed with urethane resin. In the case that urethane resin is added to the mixture of small stones and activated charcoal, the upper layer 11 is formed as an elastic and deformable layer. In the case that epoxy resin is added to the mixture of small stones and activated charcoal, the upper layer 11 is formed as a solid layer the resin smell of which is removed.

In the upper layer 11, it is preferable that the mixing ratio of small stone to activated charcoal is about 0.5–1.0, particularly about 0.6–0.8 for paddy rice. If the amount of activated charcoal is more than the small stone content, the upper layer 11 becomes brittle. If the ratio of activated charcoal to small stone is less than 0.5, the growth effect of paddy rice seedlings may not be expected. It is, therefore, important to adjust the amount of activated charcoal in accordance with the kind of seedlings. In case the mixing amount of the resin and hardening agent is increased, the mechanical strength of upper layer 11 is increased. However, this results in an increase in the manufacturing costs. If the mixing amount of resin and hardening agent is excessive, the water permeability of upper layer 11 is deteriorated. It is, therefore, preferable that the resin and hardening agent are mixed at a ratio of about 1:0.4, and it is also preferable that the mixing amount of resin and hardening agent is about 6–11% of the total amount of small stone and activated charcoal.

Hereinafter, a culture method of paddy rice seedlings using the foregoing support substrate will be described in comparison with a comparative cultivation. In this embodiment, the following culture tests (1), (2) and (3) and a comparative cultivation were conducted in a vinyl house located at Aza-Kitago, Ohaza-Nakayama, Atsumi-cho, Atsumi-gun, Aichi-ken, Japan. In the culture tests (1), (2) and (3), a culture medium 13 for growth of paddy rice seedlings was placed as a seedbed on the support substrate shown in FIG. 1. In the comparative cultivation, an amount of water permeable sand 43 was deposited on a foamed plastic board 41 on support bed 40 in the same thickness as the support substrate shown in FIG. 10, and the same culture medium 44 as in the above-described tests was placed on the foamed plastic board 41. Thus, an amount of rice seeds (the variety name: "Koshihikari") was sowed on the culture mediums 13, 14 respectively on Apr. 15, 1994, and a sufficient amount of water was supplied to the culture mediums 13, 14 in the morning and evening everyday to germinate the rice seeds.

When the growth condition of the rice seedlings was investigated eight days later, it was found that in the culture tests (1)–(3) the rice seedlings had grown in good condition without any irregular germination. It was also found that in the culture tests the root crown and hair had grown in fairly good condition. In the comparative cultivation, however, irregular growth of roots was found, and the growth of root crown and hair was inferior in comparison with the rice seedlings in the culture tests (1)–(3) even though quick there was growth of the seminal root. In the cultivation of paddy rice seedlings, it is well known in the art that a harvest amount of rice is greatly influenced by the growth of the root crown and hair. It was further found that the complete leaves of the rice seedlings in the culture tests (1)–(3) had been orderly shaped in comparison with the comparative cultivation.

When the growth condition of the rice seedlings was investigated thirty one (31) days later for rice planting, the height of the rice seedlings in the comparative cultivation was 9–10 cm, the height of the rice seedlings in the culture tests (1) and (2) was 14–15 cm, and the height of the rice seedlings in the culture test (3) was 13–14 cm. In addition, the spread condition of roots in the culture tests (1)–(3) was better than that in the comparative cultivation. Furthermore, the opening angle of complete leaves of the rice seedlings in the culture tests (1)–(3) was larger than that in the comparative cultivation, and the complete leaves were sweet, thick and elastic.

It is well known that the harvest amount of rice is greatly influenced by the quality of rice seedlings. Accordingly, the rice seedlings grown in the culture tests (1)–(3) and comparative cultivation were planted in the same condition on May 17, 1994 and harvested on Aug. 27, 1994. Each harvest amount of rice in the culture tests (1) and (2) is listed on the following table in comparison with a harvest amount of rice in the comparative cultivation.

TABLE

|  | Test (1) | Test (2) | Comparative Cultivation |
|---|---|---|---|
| Seeding date | Apr. 15, 1994 | Apr. 15, 1994 | Apr. 15, 1994 |
| Planting | May 17, 1994 | May 17, 1994 | May 17, 1994 |
| Plant length (cm) | 110 | 105 | 105 |
| Number of stumps per unit area | 60 | 60 | 60 |
| Number of tillers per one stump | 30 | — | 23 |
| Number of kernels per one ear | 125 | — | 118 |
| 1000-kernel-weight (g) | 27 | — | 25 |
| 1000-hulled rice-weight (g) | 24 | — | 22.5 |
| Hull weight (kg) of 10a | 863.3 | 628.6 | 529.2 |
| Hulled rice weight (kg) of 10a | 743.4 | 564.3 | 476.3 |
| Number of straw bags | 12.4 | 9.4 | 7.9 |
| Cut-leaf length (cm) | 31 | 32 | 32 |

As is understood from the table, the harvest amounts of rice in the culture tests (1) and (2) were 157% and 119% respectively in comparison with the harvest amount of rice in the comparative cultivation. The yield ratios of hulled rice harvested in the tests (1) and (2) were 0.59 and 0.57 respectively, better in ripening degree than the yield ratio 0.54 in the comparative cultivation. In the tests (1) and (2), the paddy rice was grown thick and hard with a fifth node of 2.9 cm on average and a fourth node of 9.2 on average. The first node of the paddy rice beneath the ear was 37.7 cm on average. Since the support substrate for plant cultivation is superior in water permeability, rice seedlings of fine quality can be cultivated without the roots rotting.

Figure 10:
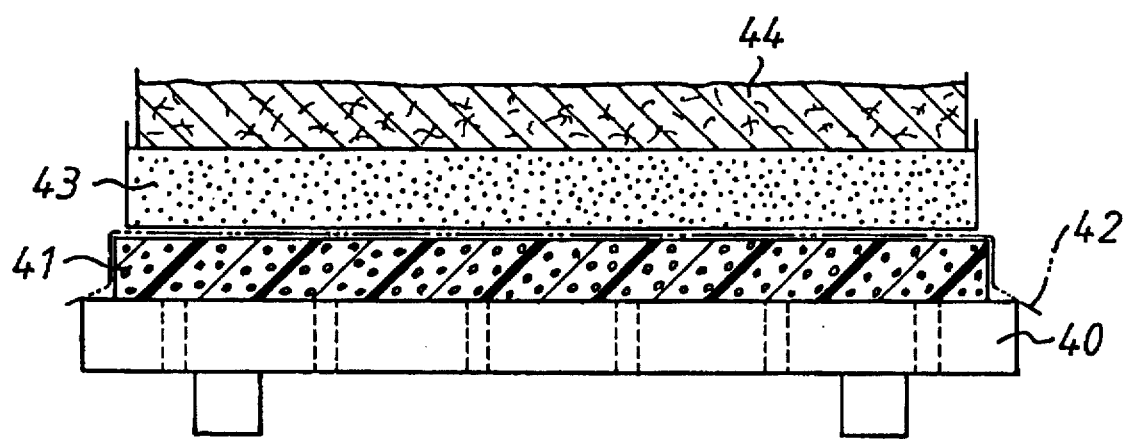
FIG. 10 is a sectional view of a support substrate for cultivation of rice seedlings.

Hereinafter, a culture method of a carnation using the support substrate will be described. In this embodiment, the following test (4) and a comparative cultivation were conducted in a vinyl house located at Higashiura-cho, Chita-gun, Aichi-ken, Japan. In the culture test (4), a commercially available culture medium for flowering plants was placed as a seedbed on the support substrate as shown in FIG. 1. In the comparative cultivation, an amount of water permeable sand was deposited on the foamed plastic board 41 on support bed 40 in the same thickness as that of the support substrate as shown in FIG. 10, and the same culture medium 44 as in the culture test (4) was placed on the foamed plastic board 41. Thus, herbaceous cutting of a carnation was made on the culture mediums in the culture test (4) and comparative cultivation on Jun. 20, 1994. Thereafter, water management of the culture mediums was made by an automatic sprinkler.

After a lapse of ten (10) days, the carnation had taken root at its lower stem and had been placed in a setting condition. When the growth condition of the carnation was checked, rooting of the carnation in the culture test (4) was more than that in the comparative cultivation. Particularly, the root hair of the carnation in the culture test (4) was 2–3 times more in comparison with the comparative cultivation. When about two months passed after setting, the carnation in the culture test (4) had grown more robustly than that in the comparative cultivation. At the beginning of December, a large pink flower began to appear in the culture test (4). At the time of shipment, the carnation grown in the culture test (4) was average in growth and more uniform in height than that in the comparative cultivation. Since the calyx of the flower in the culture test (4) was strong, the carnation did not require any protection of the flower for shipment. In addition, the pedal of the flower was superior in perfume.

Although in the above embodiments, the autoclaved lightweight concrete board was used as a reinforcement material of the lower layer 12, a wooden board or plywood may be adapted as the lower layer 12. Although in the above embodiments, small stones were used as a dielectric and non-magnetic granular article, crushed articles of inorganic material such as glass, porcelain, ceramic or the like may be adapted taking into account safety in use. Similarly, crushed articles of high polymer compounds such as plastic, glasswool material, urea resin or the like may be adapted also taking into account safety in use.

Although in the above embodiments, the support substrate for plant cultivation was comprised of the upper layer 11 mixed with activated charcoal and the lower layer 12 in the form of a water permeable reinforcement material, the components of the upper layer 11 such as small stones, activated charcoal, resin and hardening agent may be mixed and solidified at a place where a plant are cultivated. Although in the above embodiments, the activated charcoal was mixed into the entirety of upper layer 11, the activated charcoal may be mixed into only the surface or upper portion of upper layer 11. In the case that the support substrate for plant cultivation is formed as a single thick layer, a sufficient effect can be obtained even if the activated charcoal is not mixed into a lower portion of the support substrate.

Figure 2:
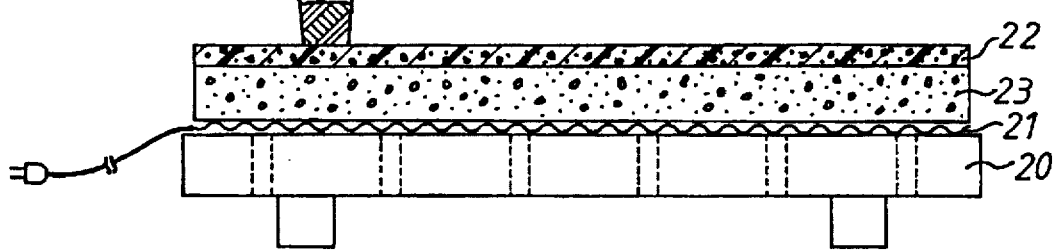
FIG. 2 is a sectional view of a support substrate for cultivation of various plants other than rice seedlings.
Figure 3:
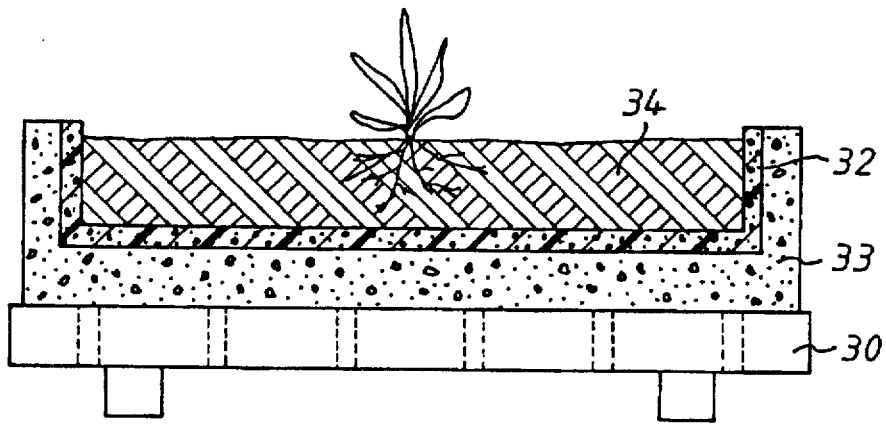
FIG. 3 is a sectional view of a support substrate for plant cultivation used in the form of a planter.

It is further noted that the foregoing cultivation method and support substrate can be applied to cultivation of various seedlings or plants other than the rice seedlings and carnations described above. For example, the culture method and support substrate can be applied to cultivation of vegetables or fruit trees such as strawberries, tomatoes, melons, grapes or the like and also applied to a flowering plant such as chrysanthemums, orchids or lilies or foliage plants. Illustrated in FIGS. 2 and 3 are culture methods for such plants as described above. In FIG. 2, the support substrate for plant cultivation according to the present invention is comprised of an upper layer 22 mixed with activated charcoal and a lower layer 23 adapted as a reinforcement material. Thus, the support substrate is placed on a support bed 20 through an electric heating sheet 21. In this embodiment, a potting plant is cultivated in a condition placed on the support substrate. In FIG. 3, the support substrate for plant cultivation according to the present invention is in the form of a planter which is comprised of an upper wall layer 32 mixed with activated charcoal and a lower wall layer 33 adapted as a reinforcement material. In this embodiment, the planter is placed on a support bed 30 and filled with culture medium 34 in which a desired plant is cultivated.

Figure 4:
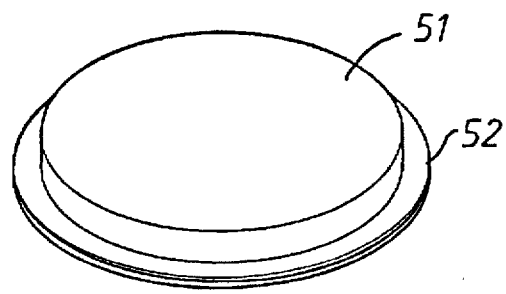
FIG. 4 is a perspective view of a support substrate for cultivation of potting plants.

Hereinafter, a support substrate suitable for cultivation of ornamental plants in a pot or planter will be described. Illustrated in FIG. 4 is a discal support substrate for cultivation of ornamental plants which is comprised of upper and lower circular layers 51 and 52. The diameter of the support substrate is determined in accordance with each size of various pots used for the ornamental plants. In this embodiment, the thickness of upper layer 51 is about 10 mm, while the thickness of lower layer 52 is about 3–5 mm. The lower layer 52 is made of a material superior in heat insulation, water permeability and water retention such as non-woven fabric, felt or chemical fiber sheet solidified by heat. The upper layer 51 is made of dried small stones and activated charcoal which were mixed with urethane or epoxy resin and a hardening agent and solidified in a condition deposited on the lower layer 52. The upper layer 51 is formed smaller in diameter than the lower layer 52 and placed at the center of lower layer 52.

Figure 5:
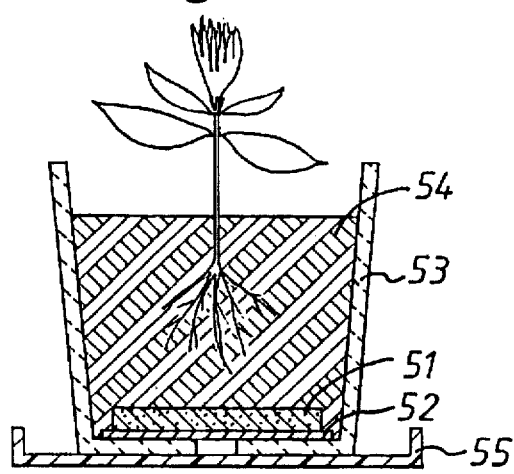
FIG. 5 is a sectional view illustrating a culture method of ornamental plants using the support substrate shown in FIG. 4.
Figure 6:
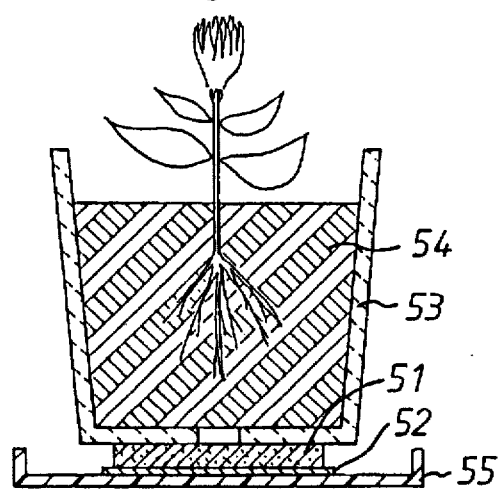
FIG. 6 is a sectional view illustrating another culture method of ornamental plants using the support substrate shown in FIG. 4.

As shown in FIG. 5, the discal support substrate is placed on the internal bottom of a pot 53 in such a manner that the upper layer 51 is located above the lower layer 52. Thus, the pot is filled with culture medium 54 in which an ornamental plant such a flowering plant or tree is planted. When put on an appropriate place in a room or balcony, the pot 53 is placed on a water receiving platter 55. Alternatively, as shown in FIG. 6, the discal support substrate is placed on the water receiving platter 55, and the pot 53 is placed on the support substrate and filled with the culture medium 54.

Figure 7:
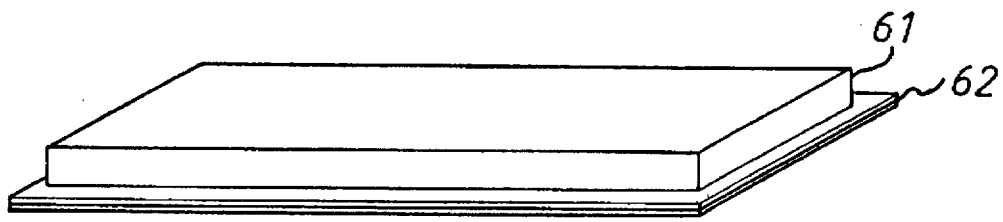
FIG. 7 is a perspective view of another embodiment of a support substrate for cultivation of ornamental plants.

Illustrated in FIG. 7 is another embodiment of a support substrate for cultivation of ornamental plants which is comprised of upper and lower rectangular layers 61 and 62. The size of the support substrate is determined in accordance with each size of planters used for the ornamental plants. In this embodiment, the size of the support substrate are 120 mm in width and 240 mm in length. The upper and lower layers 61 and 62 are made of the same materials as in the upper and lower layers 51 and 52 shown in FIG. 4 and formed in the same thickness. The upper layer 61 is formed smaller than the lower layer 62 and placed at the center of lower layer 62.

Figure 8:
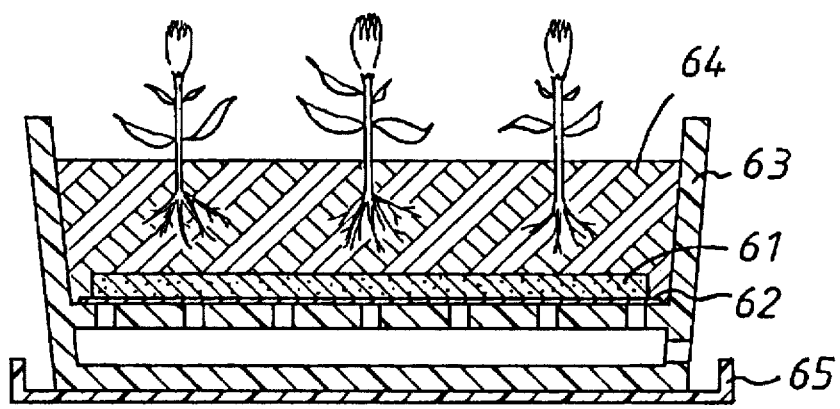
FIG. 8 is a sectional view illustrating a culture method of ornamental plants using the support substrate shown in FIG. 7.
Figure 9:
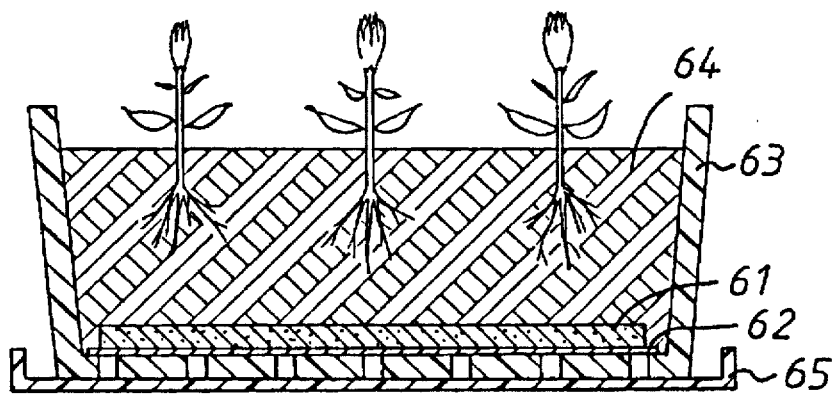
FIG. 9 is a sectional view illustrating another culture method of ornamental plants using the support substrate shown in FIG. 7.

As shown in FIGS. 8 and 9, the rectangular support substrate is placed on the internal bottom of a planter 63 in such a manner that the upper layer 61 is located above the lower layer 62. Thus, the planter 63 is filled with culture medium 64 in which an ornamental plant such as a flowering plant or tree is planted. When put on an appropriate place in a room or balcony, the planter 63 is placed on a water receiving platter 65. Alternatively, the rectangular support substrate may be placed under the planter 65 in the same manner as in the embodiment shown in FIG. 6.

In the case that seedlings of the ornamental plants were cultivated in such a manner as described above, growth hormones of the plant roots became active in function to increase healthy white fresh roots, and the stem of the plant became strong in its entirety. In this respect, it is considered that such growth of the plant seedlings was caused by stable temperature in the ground and purification of air and water in the ground. In the case that the ornamental plants were cultivated, leaves, buds and flowers of the plants became lustrous and fresh, and the flower perfume was enhanced. In this respect, it is considered that such a good condition of the plants was caused by healthy growth of the plant roots. The support substrate for cultivation of ornamental plants is very convenient in use since it can be formed in an appropriate size for use in a pot or planter.

What is claimed is:

1. A method for growing plants, comprising the steps of:
   providing a culture medium for planting a selected plant therein; and
   providing a support substrate at least on top of which said culture medium is positioned, said step of providing said support substrate including the steps of forming an upper, water permeable layer having a predetermined amount of activated charcoal based on said selected plant in said culture medium and a non-magnetic, dielectric, granular component mixed with a resin and a hardening agent, and forming a lower, water permeable reinforcing layer, wherein
   a water permeability of said support substrate is defined greater than a water permeability of said culture medium.

2. A method according to claim 1, wherein said step of forming said upper layer further includes mixing said non-magnetic, dielectric, granular component with said predetermined amount of activated charcoal at a ratio of 0.5 to 1.0 part by weight.

3. A method according to claim 1, wherein said non-magnetic, dielectric, granular component is in the form of dried small stones.

4. A method according to claim 1, wherein said non-magnetic, dielectric, granular component is in the form of crushed articles of inorganic material.

5. A method according to claim 1, wherein said non-magnetic, dielectric, granular component is in the form of crushed articles of high-polymer compounds.

6. A method according to claim 1, wherein said step of providing said culture medium includes providing said culture medium in the form of a seedbed placed on said support substrate.

7. A method according to claim 1, wherein said step of providing said culture medium includes providing said culture medium in a planter for planting the selected plant therein and placing the planter on said support substrate.

8. A method according to claim 1, wherein said step of providing said support substrate includes placing said support substrate on the internal bottom of a planter in such a manner that said upper, water permeable layer is located above said lower, water permeable reinforcing layer.

* * * * *